(12) United States Patent
Gervais et al.

(10) Patent No.: US 7,243,695 B2
(45) Date of Patent: Jul. 17, 2007

(54) CROWN REINFORCEMENT FOR A RADIAL TIRE

(75) Inventors: Philippe Gervais, Riom (FR); Lucien Bondu, La Roche Noire (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 175 days.

(21) Appl. No.: 11/201,869

(22) Filed: Aug. 11, 2005

(65) Prior Publication Data

US 2006/0180257 A1 Aug. 17, 2006

Related U.S. Application Data

(63) Continuation of application No. PCT/EP04/01362, filed on Feb. 13, 2004.

(30) Foreign Application Priority Data

Feb. 17, 2003 (FR) .................................. 03 01904

(51) Int. Cl.
*B60C 9/18* (2006.01)
(52) U.S. Cl. .................................................... 152/532
(58) Field of Classification Search ................ 152/532, 152/534, 535
See application file for complete search history.

(56) References Cited

U.S. PATENT DOCUMENTS 5,605,589 A * 2/1997 Johanning et al. .......... 152/532
5,779,828 A * 7/1998 Okamoto .................... 152/532
6,536,496 B1 * 3/2003 Bondu ........................ 152/532

FOREIGN PATENT DOCUMENTS

JP       2000177316 A  *  6/2000

* cited by examiner

*Primary Examiner*—Adrienne C. Johnstone
(74) *Attorney, Agent, or Firm*—Cohen Pontani Lieberman & Pavane LLP

(57) ABSTRACT

The invention relates to a tire in which at least one first profiled element P of rubber mix separates the axially widest ply of reinforcement elements from at least one end of a second ply, axially narrower than the axially widest ply, the axially outer end of said first profiled element P being located at a distance from the equatorial plane of the tire which is less than the distance between said plane and the end of the axially widest ply of reinforcement elements, said profiled element P being radially separated at least in part from the liner C of said axially narrower ply of reinforcement elements by a second profiled element of rubber mix G, and said first and second profiled elements of rubber mix P and G and said liner C having secant modules of elasticity under tension at 10% elongation MP, MG, MC respectively such that $MC \geqq MG > MP$.

8 Claims, 3 Drawing Sheets

CROWN REINFORCEMENT FOR A RADIAL TIRE

This application is a U.S. Continuation Application under 35 USC 371 of International Application PCT/EP2004/ 001362 filed Feb. 13, 2004.

BACKGROUND OF THE INVENTION

The present invention relates to a tire having a radial carcass reinforcement, and more particularly to a tire intended to be fitted on vehicles bearing heavy loads and traveling at sustained speed, such as, for example, lorries, tractors, trailers or highway buses.

Generally, the carcass reinforcement is anchored on either side in the zone of the bead and is radially surmounted by a crown reinforcement formed of at least two plies, which are superposed and formed of cords or cables which are parallel within each ply. It also generally comprises a ply of metal wires or cables of low extensibility which form an angle of between 45° and 90° with the circumferential direction, this ply, referred to as a triangulation ply, being radially located between the carcass reinforcement and the first, so-called working, crown ply, formed of parallel wires or cables having angles at most equal to 45° in absolute value. The triangulation ply forms with at least said working ply a triangulated reinforcement, which undergoes little deformation under the different stresses to which it is subjected, the essential role of the triangulation ply being to take up the transverse compressive stresses to which all the reinforcement elements in the zone of the crown of the tire are subjected.

The crown reinforcement comprises at least one working ply; when said crown reinforcement comprises at least two working plies, these are formed of inextensible metallic reinforcement elements, which are parallel to each other within each ply and crossed from one ply to the next, forming angles of between 10° and 45° with the circumferential direction. Said working plies, which form the working reinforcement, may also be covered by at least one so-called protective ply, formed of advantageously metallic, extensible reinforcement elements, which are referred to as elastic elements.

In the case of tires for "heavy vehicles", a single protective ply is usually present and its protective elements are in most cases oriented in the same direction and at the same angle in absolute value as those of the reinforcement elements of the radially outermost and hence radially adjacent working ply. In the case of construction-vehicle tires which are intended to travel on relatively bumpy roads, it is advantageous for two protective plies to be present, the reinforcement elements being crossed from one ply to the next and the reinforcement elements of the radially inner protective ply being crossed with the inextensible reinforcement elements of the radially outer working ply adjacent to said radially inner protective ply.

Cables are said to be inextensible when said cables have a relative elongation at most equal to 0.2% under a tensile force equal to 10% of the breaking load.

Cables are said to be elastic when said cables have a relative elongation at least equal to 4% under a tensile force equal to the breaking load.

The circumferential direction of the tire, or longitudinal direction, is the direction corresponding to the periphery of the tire and defined by the direction of rolling of the tire.

The transverse or axial direction of the tire is parallel to the axis of rotation of the tire.

The radial direction is a direction intersecting and perpendicular to the axis of rotation of the tire.

The axis of rotation of the tire is the axis around which it rotates in normal use.

A radial or meridian plane is a plane containing the axis of rotation of the tire.

The circumferential median plane, or equatorial plane, is a plane which is perpendicular to the axis of rotation of the tire and divides the tire into two halves.

Certain current tires, referred to as "highway" tires, are intended to travel at high speed and on increasingly long journeys, owing to the improvement in road networks and the growth in motorway networks throughout the world. All the conditions under which such a tire is required to travel without doubt make it possible to increase the number of kilometers traveled, the wear of the tire being less; on the other hand, the endurance of the latter, and in particular of the crown reinforcement, is greatly impaired.

The stresses existing at the level of the crown reinforcement, and more particularly the shearing stresses between the crown plies, combined with a non-negligible increase in the operating temperature at the ends of the axially shortest working ply, result in the appearance and propagation of cracks in the rubber at said ends, despite the presence of a thickened layer of rubber at the junction of the edges of the working crown plies. The same problem exists in the case of edges of two plies having reinforcement elements, said other ply not necessarily being radially adjacent to the first.

The progress made in terms of length of wear life (number of kilometers traveled) of "heavy-vehicle" tires, and also the possibility of easy, economical subsequent retreading, requires a crown reinforcement, the resistance to separation between the edges of working plies of which is improved.

In order to overcome the above disadvantages and to improve the life of the crown reinforcement of the type of tire in question, a certain number of prior patents claim solutions relating to the structure and quality of the layers and/or profiled elements of rubber mixes which are arranged between and/or around the ends of plies, and more particularly the ends of the axially shortest working ply.

French Patent 1 389 428, to improve the resistance to degradation of the rubber mixes located in the vicinity of the edges of the crown reinforcement, advocates the use, in combination with a tread of low hysteresis, of a rubber profiled element covering at least the sides and the marginal edges of the crown reinforcement and formed of a rubber mix of low hysteresis.

French Patent 2 222 232, in order to avoid separations between crown reinforcement plies, teaches coating the ends of the reinforcement with a pad of rubber, the Shore A hardness of which differs from that of the tread surmounting said reinforcement, and is greater than the Shore A hardness of the profiled element of rubber mix arranged between the edges of crown reinforcement plies and the carcass reinforcement.

U.S. Pat. No. 5,154,217 uses a different unit of measurement, and claims arranging between the ends of two plies, in the extension of the ply between said two plies, a pad of rubber mix, the elasticity modulus of which at 100% elongation is greater than the modulus of the same name of the tread.

To effect joining of the respective two edges of two crown reinforcement plies, French Patent 2 298 448 discloses the use of so-called shearing rubbers between said edges, of a high Shore A hardness and elasticity modulus at 100%, this use being combined with the use of anisotropic rubber strips arranged between the edges of the crown reinforcement and the carcass reinforcement.

The same applies to the case of joining the crown reinforcement plies described in French Patent 2 499 912, the lateral part of the rubber layer arranged between the two main plies of the crown reinforcement being formed of a rubber mix of high Shore hardness.

Other solutions have been considered for improving the resistance to separation of the crown reinforcement plies, which solutions consist of coating at least the end of the axially least wide ply in at least one layer of rubber mix, whether or not reinforced by reinforcement elements. In the case of a single layer, the latter is advantageously turned up over the end of the ply, as described and illustrated, for example, in document FR 1 226 595, in which the layer is reinforced by very fine metal wires, or in document JP 266 703, the protective layer being formed solely of rubber of a high elasticity modulus, or alternatively in French Patent 2 671 516.

It was noted that the various structures listed above did not provide a completely satisfactory solution under conditions of travel which are highly disadvantageous to the tire.

In Patent EP 1 062 106, the Applicant proposed a tire, the crown reinforcement of which comprises at least two plies of reinforcement elements, in which the edge of the axially least wide ply is separated from the axially widest ply by a profiled element of rubber mix, the axially outer end of which is located at a distance from the equatorial plane of the tire which is at least equal to the distance between said plane and the end of the widest ply and said profiled element itself being separated from the liner of the least wide ply by an edging rubber, said profiled element, said edging rubber and said liner having respectively secant modules of elasticity under tension at 10% relative elongation such that they decrease radially towards the inside from the liner to the profiled element.

The tests performed with this type of tire show that in view of current demands relating to the applications in question, it is still necessary to improve the performance of the tires, in particular in terms of endurance.

The inventors have thus set themselves the task of producing tires intended to be fitted on vehicles bearing heavy loads and traveling at sustained speed, having improved endurance compared with known tires, and in particular of limiting the appearance and propagation of cracks at the end of the axially narrowest working ply.

BRIEF SUMMARY OF THE INVENTION

This object has been achieved according to the invention by a tire having a radial carcass reinforcement, surmounted by a crown reinforcement comprising at least two plies of reinforcement elements which are parallel to each other within each ply, said two plies being of unequal axial widths, at least one first profiled element P of rubber mix separating the axially widest ply of reinforcement elements from at least one end of a second ply, axially narrower than the axially widest ply, the axially outer end of said first profiled element P being located at a distance from the equatorial plane of the tire less than the distance between said plane and the end of the axially widest ply of reinforcement elements, said profiled element P being radially separated at least in part from the liner C of said axially narrower ply of reinforcement elements by a second profiled element of rubber mix G, and said first and second profiled elements of rubber mix P and G and said liner C having respectively secant modules of elasticity under tension at 10% elongation MP, MG, MC such that $MC \geq MG > MP$.

The combination of the layers of rubber mixes P and G by the selection of their respective elasticity modules MP and MG permit an improvement in the resistance of the crown structure to separation between the ends of the working plies. The presence of these layers of rubber mix in fact seems to make it possible, owing to the decoupling of the plies thus obtained, to protect the end of the narrowest ply and thus prevent or at the very least delay the appearance of delamination of said end of the axially narrowest ply.

Preferably, the total of the respective thicknesses of the profiled elements of rubber mix P and G, measured at the end of the less wide ply of the two plies in question, will preferably be between 30% and 80% of the overall thickness of rubber mix between generatrices of cables respectively of the two plies: a thickness of less than 30% not making it possible to obtain convincing results, and a thickness of more than 80% being useless with regard to the improvement in the resistance to separation between plies and disadvantageous from the point of view of cost.

More preferably, the profiled elements of rubber mix P and G, at the axially outer end of the axially narrowest ply, are of thicknesses such that the radial distance d between the two plies, separated by said profiled elements of rubber mix P and G, satisfies the relationship:

$$3/5 \cdot \phi < d < 5 \cdot \phi$$

with $\phi$ being the diameter of the reinforcement elements of the axially narrower ply.

The distance d is measured from cable to cable, that is to say between the cable of a first ply and the cable of a second ply. In other words, this distance d covers the thickness of the profiled elements of rubber mix P and G and the respective thicknesses of the calendering rubber mixes, radially external to the cables of the radially inner ply and radially internal to the cables of the radially outer ply.

According to an advantageous embodiment of the invention, the axially narrowest ply is radially external to the axially widest ply. According to this embodiment, the first profiled element of rubber mix G is at least in part radially external to the second profiled element of rubber mix P.

One advantageous embodiment of the invention provides for the axially outer end of the second profiled element of rubber mix G to be located at a distance from said plane which is at least equal to half the width of said axially narrower ply of reinforcement elements. According to this embodiment of the invention, the end of said axially narrowest ply is radially separated from the widest ply by the radial superposition of the two profiled elements of rubber mix P and G.

According to a preferred embodiment of the invention, the second profiled element of rubber mix G has its axially inner end located at a distance from the equatorial plane which is at most equal to the distance between said plane and the axially inner end of said first profiled element of rubber mix P. According to this embodiment and in particular when the axially outer end of the second profiled element of rubber mix G is located at a distance from said plane at least equal to half the width of said axially narrower ply of reinforcement elements, the first profiled element of rubber mix P is not in contact with said axially narrowest ply.

More preferably still according to the invention, the axial width D of the profiled element of rubber mix G between the axially inner end of said profiled element G and the end of the axially narrowest ply of reinforcement elements is such that:

$$3.\phi \leq D,$$

with φ being the diameter of the reinforcement elements of the axially narrowest ply.

Such a relationship defines a zone of engagement between the profiled element of rubber mix G and the axially narrowest ply. Such an engagement below a value equal to three times the diameter of the reinforcement elements of the axially narrowest ply may not be sufficient to achieve decoupling of the plies to obtain in particular attenuation of the stresses at the end of the axially narrowest ply.

When the plies in question are working plies formed of reinforcement elements which are parallel to each other and crossed from one ply to the next, the axial width D of the profiled element of rubber mix G between the axially inner end of said profiled element G and the end of the axially narrowest ply of reinforcement elements is such that:

$$D \leq 20. \phi$$

A value of this engagement greater than twenty times the diameter of the reinforcement elements of the axially narrowest working ply may result in an excessive reduction in the drift rigidity.

When the crown reinforcement of the tire according to the invention is formed of at least one working reinforcement comprising at least two plies of reinforcement elements, which are parallel to each other within each ply and preferably crossed from one ply to the next, said two plies being of unequal axial widths, and furthermore comprises a protective crown ply, radially external to the working crown reinforcement, of an axial width between those of the working plies and greater than the width of the working ply radially adjacent to said protective crown ply, the axially outer end of the first profiled element of rubber mix P is advantageously located at a distance from the equatorial plane of the tire at least equal to half the width of the protective crown ply. Such an embodiment permits decoupling of the end of the protective crown ply and of the axially widest ply of the working reinforcement. The position of the axially outer end of the second profiled element of rubber mix G is advantageously located at a distance from said plane at least equal to half the width of the protective crown ply. According to such an embodiment of the invention, when the crown reinforcement comprises a protective ply the end of which is axially between the ends of two working plies, said end of the protective crown ply is radially separated from the widest working ply by the radial superposition of the two profiled elements of rubber mix P and G.

Preferably, when the crown reinforcement of the tire according to the invention comprises a protective ply the end of which is axially between the ends of two working plies, the axially inner end of the first profiled element of rubber mix P is located at a distance from the equatorial plane at least equal to half the width of the axially least wide working ply. Such an embodiment makes it possible to retain decoupling of the end of the axially narrowest working ply and of the axially widest working ply merely by the presence of the second profiled element of rubber mix G. The presence of the protective crown ply may in fact necessitate not interposing the two profiled elements of rubber mix P and G radially between the two working plies in order to avoid an overall thickness of the tire which would be unacceptable in this zone.

According to one variant embodiment of the invention, the crown reinforcement of the tire being formed of at least one working reinforcement comprising at least one working ply of reinforcement elements, a third profiled element of rubber mix B borders the end of the radially innermost working ply of reinforcement elements, said third profiled element of rubber mix B being at least in part radially internal to said radially innermost ply.

The term "border" must be understood according to the invention as meaning that the third profiled element of rubber mix B is adjacent to said ply and that the axially outer end of said third profiled element of rubber mix B is located at a distance from said plane at least equal to half the width of said radially innermost working ply of reinforcement elements.

The tests performed according to this variant embodiment of the invention have shown that the presence of such a radially inner layer of rubber mix B adjacent to the radially innermost ply, and more particularly when said ply is axially widest, improves still further the resistance of the crown structure to separation between the ends of the plies of reinforcement elements. It would seem that the presence of this layer of rubber mix B limits the propagation of cracks which may appear in the rubber mass in the vicinity of the ends of the crown plies.

According to this last variant embodiment of the invention, when the crown reinforcement furthermore comprises a triangulation ply radially internal to said radially innermost working ply, and preferably of axial width less than that of said radially innermost working ply, the third profiled element of rubber mix B may be radially inserted in part between said radially innermost working ply and the triangulation ply, or alternatively may be radially in part to the inside of the triangulation ply, or alternatively also the third profiled element of rubber mix B may not be in contact with said triangulation ply.

More advantageously still according to this variant embodiment of the invention, the third profiled element of rubber mix B surrounds the end of said radially innermost working ply and has a part radially external to said radially innermost working ply. Such an embodiment of the invention may also provide radial covering of the third profiled element of rubber mix B with the first profiled element of rubber mix P and/or with the second profiled element of rubber mix G.

According to another variant embodiment of the invention, the crown reinforcement being formed of at least one working reinforcement comprising at least one ply of reinforcement elements, the second profiled element of rubber mix G surrounds the end of said radially innermost working ply and said second profiled element of rubber mix G has a part radially internal to the radially innermost working ply. This other variant embodiment of the invention provides for the second profiled element of rubber mix G to combine both its function of decoupling two plies of reinforcement elements and the function previously performed by the third profiled element of rubber mix B.

The invention also provides, according to this variant embodiment in which the second profiled element of rubber mix G has a part radially internal to the radially innermost working ply, for the presence of a third profiled element of rubber mix B at least in part radially internal to said radially innermost ply, said profiled elements of rubber mix G and B being able to be superposed radially to the outside and/or radially to the inside of the radially innermost working ply.

More advantageously still, the crown reinforcement furthermore comprising a triangulation ply radially internal to the radially innermost working ply, and advantageously of an axial width less than that of said the radially innermost working ply, the second profiled element of rubber mix G may be radially inserted in part between the radially innermost working ply and the triangulation ply, or alternatively may be radially in part to the inside of the triangulation ply, or alternatively also the second profiled element of rubber mix G may not be in contact with said triangulation ply.

BRIEF DESCRIPTION OF THE DRAWINGS

Other advantageous details and characteristics of the invention will become apparent hereafter from the description of examples of embodiment of the invention with reference to FIGS. 1 to 3, which represent.

The figures are not shown to scale in order to simplify understanding thereof.

DETAILED DESCRIPTION OF THE INVENTION

Figure 1:
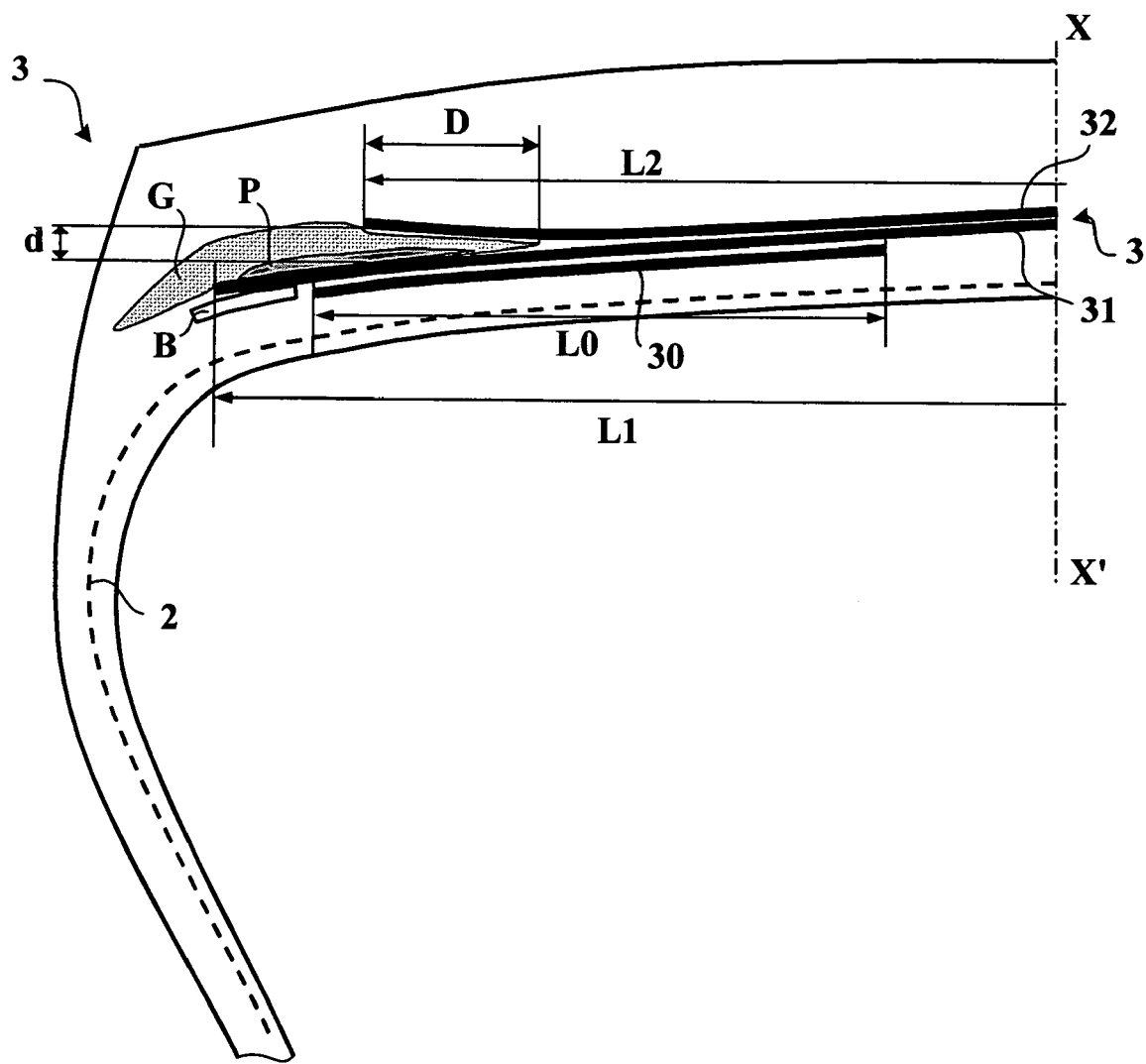
FIG. 1: a partial view in meridian section of a diagram of a tire according to one embodiment of the invention.

FIG. 1 shows a partial diagrammatic view in meridian section of a tire 1 of dimension 315/80.R.22.5 X. The tire 1 has a form ratio H/S substantially equal to 0.65, H being the height of the tire on its rim and S the maximum axial width of said tire mounted on its 9.00×22.5 operating rim and inflated to a recommended pressure of 9 bar.

Figure 2:
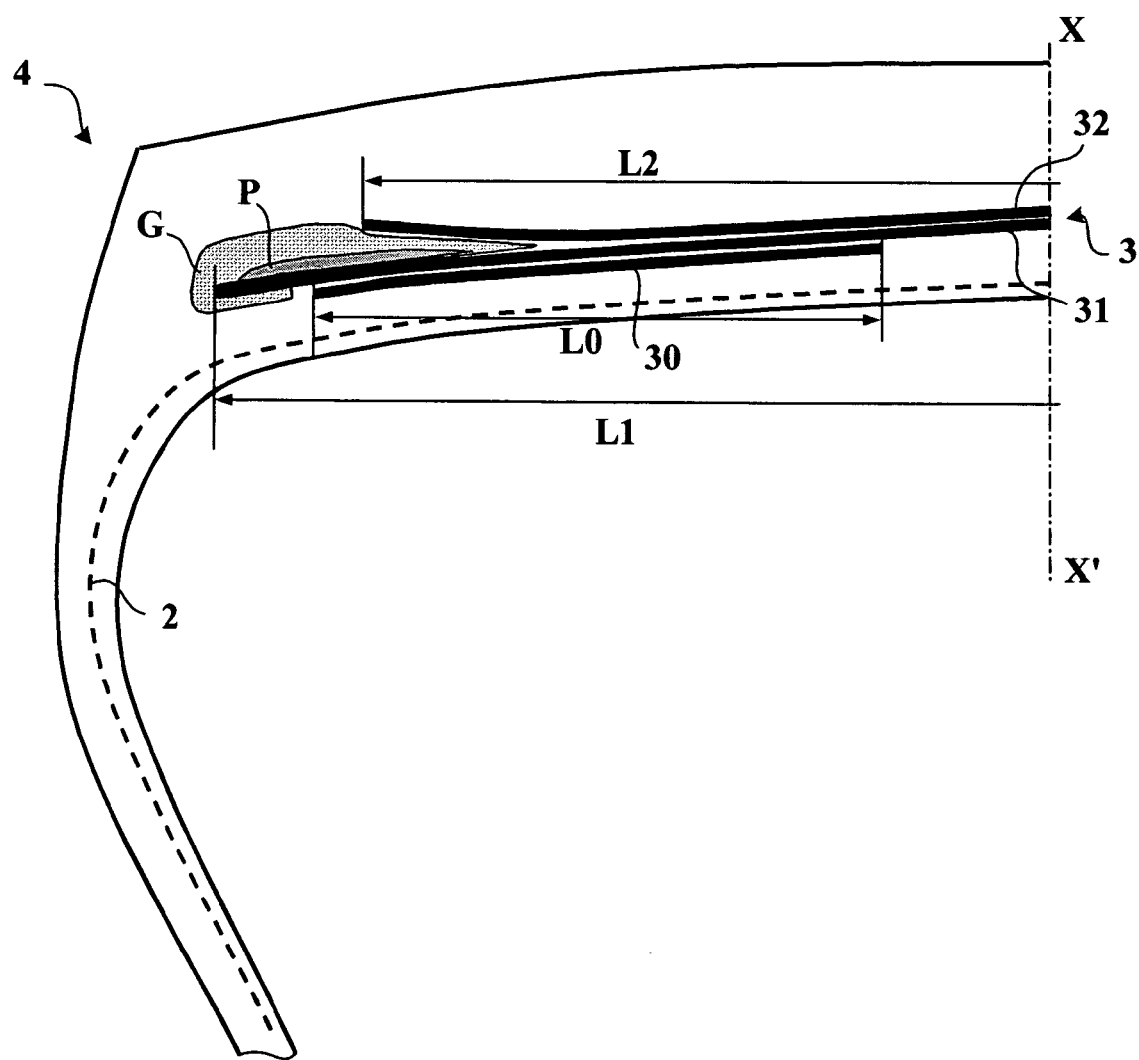
FIG. 2: a partial view in meridian section of a diagram of a tire according to a second embodiment of the invention.
Figure 3:
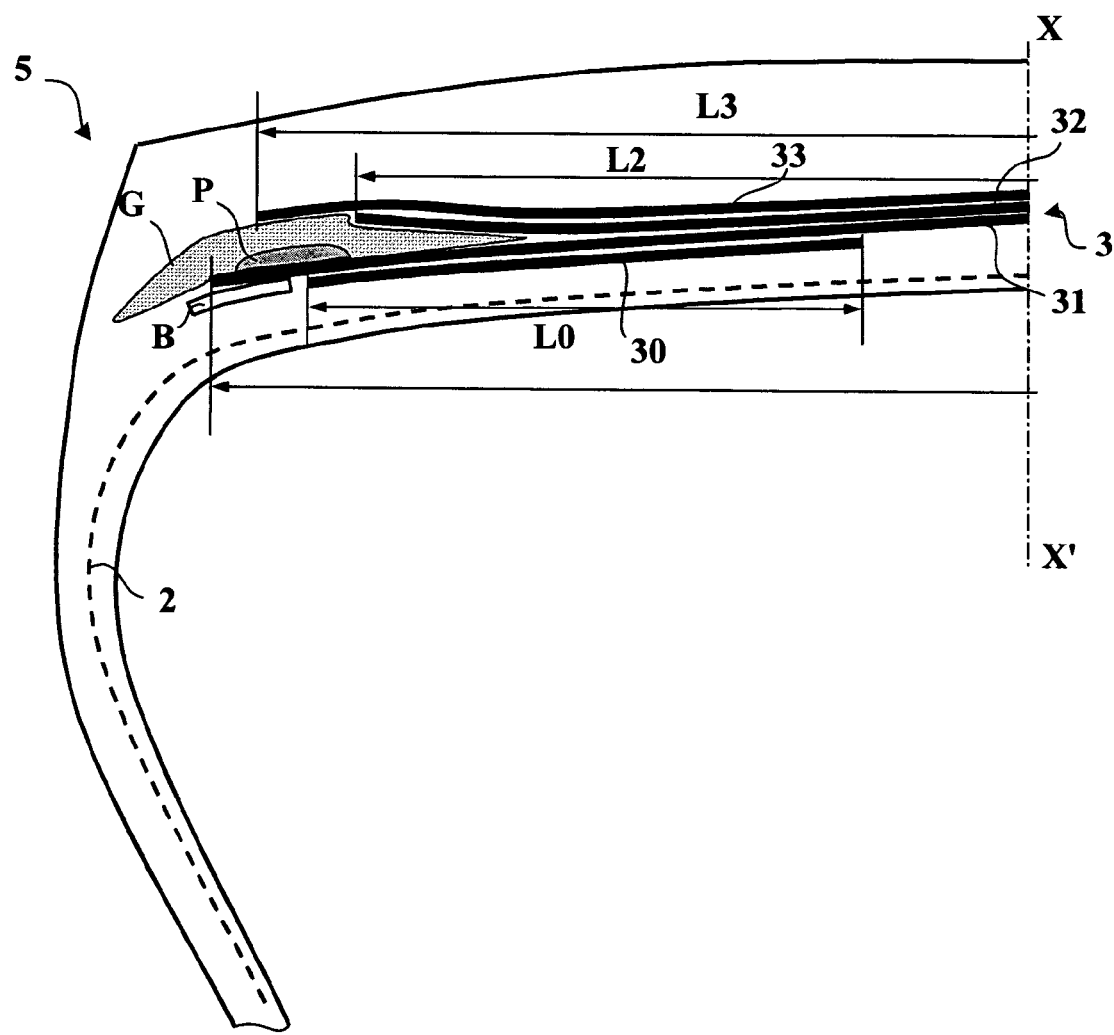
FIG. 3: a partial view in meridian section of a diagram of a tire according to a third embodiment of the invention.

FIGS. 1 to 3 show only a half-view of the tires which are extended symmetrically relative to the axis XX', which represents the circumferential median plane, or equatorial plane, of a tire.

The tire 1 comprises a radial carcass reinforcement composed of a single ply 2 of inextensible metal cables, that is to say, cables which have an elongation of at most 0.2% under a tensile force equal to 10% of the breaking load. Said carcass reinforcement is anchored within each bead; said beads are not shown in FIGS. 1 to 3. It is surmounted, radially to the outside, by a crown reinforcement 3 comprising radially from the inside to the outside:

- a first half-crown ply 30 referred to as a triangulation ply, formed of inextensible metal cables made of steel, which are oriented at an angle $\alpha_0$, equal in the case described to 65°,
- radially at the level of the triangulation ply 30, a layer B of rubber mixes,
- radially to the outside of said ply 30 and of the layer B of rubber mixes, a first working crown ply 31, formed of inextensible metal cables made of steel forming an angle $\alpha_1$ equal to 18° with the circumferential direction, the cables of the triangulation ply 30 and of the first working ply having the same direction,
- radially to the outside and in contact with the working crown ply 31, a layer P of rubber mixes,
- radially to the outside and in contact with the layer P of rubber mixes, a layer G of rubber mix,
- then, radially to the outside of the layer of rubber mix G, a second working crown ply 32 formed of metal cables identical to those of the first ply 31, and forming with the circumferential direction an angle $\alpha_2$ opposed to the angle $\alpha_1$ and, in the case illustrated, equal in absolute value to said angle $\alpha_1$ of 18°, (but possibly being different from said angle $\alpha_1$).

The axial width $L_1$ of the first working ply 31 is equal to 236 mm, when the tire is mounted on its operating rim and inflated to its recommended pressure, which, for a tire of conventional form, is less than the width of the tread, which is equal, in the case in question, to 242 mm. The axial width $L_2$ of the second working ply 32 is less than the width $L_1$, since it is equal to 216 mm. The axial width $L_0$ of a triangulation half-ply 30 is equal to 70 mm and its axially outer end is at an axial distance from the equatorial plane equal to 100 mm.

The two working plies 31 and 32 have respectively liners $C_1$ and $C_2$ formed of the same rubber mix. Of course, the liners might be different.

The combination of the layers of rubber mix P and G provides decoupling between the working ply 31 and the end of the radially outer working ply 32.

The zone of engagement of the profiled elements of rubber mix P and G between the two working plies 31 and 32 is defined by the thickness, or more precisely the radial distance d, between the end of the ply 32 and the ply 31 and by the axial width D of the profiled element of rubber mix G between the axially inner end of said profiled element of rubber mix G and the end of the axially narrowest working crown ply 32. The radial distance d is equal to 3.5 mm. The axial distance D is equal to 21 mm, or approximately 14 times the diameter $\phi_2$ of the reinforcement elements of the working ply 32, the diameter $\phi_2$ being equal to 1.5 mm.

The elasticity modules at 10% elongation of the layers of rubber mix P and G and of the calendering layer $C_2$ of the working ply 32, MP and MG and $MC_2$ respectively, are selected such that they satisfy the following relationship: $MP<MG \leq MC_2$. Such an embodiment of the tire 3 makes it possible to reduce the stresses in the calendering layer $P_2$, passing through the layer of rubber mix G in contact with the working ply 32 as far as the layer of rubber mix P in contact with the working ply 31, which makes it possible to improve the resistance of the crown structure to separation between the ends of the working plies 31 and 32.

FIG. 2 is a diagrammatic view in meridian section of a tire 4, similar to that of FIG. 1, which differs from the latter by the absence of a layer of rubber mix B and by the presence of a layer of rubber mix G which surrounds the end of the working ply 31 and is extended radially to the inside of said working crown ply.

In this second example of embodiment of the invention, the layer of rubber mix G, in addition to its function of decoupling between the two working crown plies 31 and 32, performs the function of the layer of rubber mix B of the first example of embodiment of the invention illustrated in FIG. 1.

FIG. 3 is a diagrammatic view in meridian section of a tire 5, similar to that of FIG. 1 but which differs from the latter by the presence of a supplementary protective ply 33. The protective ply 33 is positioned radially to the outside of the working ply 32. The protective ply 33 is a ply of what are called elastic metal cables made of steel, that is to say those having a relative elongation of at least 2% under a force equal to 10% of the breaking load (whereas an elongation of less than 2% is the characteristic of an inextensible cable), oriented relative to the circumferential direction by an angle $\alpha_3$ of the same direction as the angle $\alpha_2$, but greater in absolute value than said angle $\alpha_2$ of 8° since it is equal to 26°. The width $L_3$ of the protective ply 33 is greater than the width $L_2$ of the least wide and radially adjacent working ply 32, and equal to 260 mm and hence less than the width $L_1$.

According to this third example of embodiment of the invention, the combination of the rubber elements of rubber mix P and G results in decoupling of the axially widest working ply 31 and of the end of the protective crown ply 33.

Similarly to the case of FIG. 1, the elasticity modules at 10% elongation of the layers of rubber mix P and G and of the calendering layer $C_3$ of the protective ply 33, MP and MG and $MC_3$ respectively, are selected such that they satisfy the following relationship: $MP<MG \leq MC_3$. The liner $C_3$ of the protective crown ply 33 may be either identical to or different from one and/or the other of the liners $C_1$, $C_2$ of the working crown plies 31 and 32.

Such an embodiment of the tire 5 makes it possible to reduce the stresses in the calendering layer $C_3$, passing through the layer of rubber mix G in contact with the protective ply 33 as far as the layer of rubber mix P in contact with the working ply 31, which makes it possible to improve the resistance of the crown structure to separation between the ends of the working ply 31 and the protective ply 33.

Although the join between the plies 31 and 32 is less disadvantageous from the point of view of inter-ply separation in accordance with the representation of FIG. 3, the optimum solution, according to the invention, is that the axially inner end of the layer of rubber mix G is maintained between the working crown plies 31 and 32 to maintain decoupling between the working crown ply 31 and the end of the working crown ply 32. As the stresses which may appear at the end of the working crown ply 32 in the case of the representation of FIG. 3 are less than the stresses of the preceding representations which do not comprise a protective crown ply, the axially inner end of the first profiled element of rubber mix P is located at a distance from the equatorial plane at least equal to half the width of the axially least wide working ply 32. Such an embodiment makes it possible in particular not to increase the thickness of the crown reinforcement unacceptably in the axial zone of the tire comprising all the crown reinforcement plies 30, 31, 32 and 33.

Tires corresponding to the structure described in accordance with FIG. 1 and tires (not shown), which differ from the previous ones by the absence of the third profiled element of rubber mix B, were compared with each other and with reference tires the crown reinforcement of which is composed of the same crown plies, but with edges of working plies 31 and 32 which are separated by a single profiled element of rubber mix, the elasticity modulus at 10% of which is slightly less than the modulus of the same name of the identical liner for both plies.

Comparative running of the tires was carried out firstly on a motorway circuit, that is to say, a circuit where the percentage of straight lines traveled is very high, and secondly on what is called a high-drift circuit, that is to say, a circuit where the percentage of curves is the highest, the load and inflation pressure conditions being the same for both types of travel and those recommended by the tire manufacturers.

The results obtained show an average advantage of 20% in kilometers for the tires produced according to the invention which do not comprise the third profiled element of rubber mix B, compared with the reference tires in which the edges of the working plies 31 and 32 are separated by a single profiled element of rubber mix.

Furthermore, it would appear that the tires produced in accordance with the illustration of FIG. 1 have an average advantage of 10% in kilometers compared with the tires produced according to the invention which do not comprise the third profiled element of rubber mix B.

These results show firstly that the combination of the first and second profiled elements of rubber mix P and G, positioned according to the invention and having the characteristics mentioned previously, result in improved endurance compared with the known tires.

Furthermore, the presence of the third profiled element of rubber mix B bordering the end of the radially innermost working ply of reinforcement elements makes it possible to limit still further the propagation of cracks at the ends of the plies of the crown reinforcement.

The invention claimed is:

1. A tire having a radial carcass reinforcement, surmounted by a crown reinforcement comprising at least two plies of reinforcement elements which are parallel to each other within each ply, said two plies being of unequal axial widths, wherein at least one first profiled element P of rubber mix separates the axially widest ply of reinforcement elements from at least one end of a second ply, axially narrower than the axially widest ply, wherein the axially outer end of said first profiled element P is located at a distance from the equatorial plane of the tire less than the distance between said plane and the end of the axially widest ply of reinforcement elements, wherein said profiled element P is radially separated at least in part from the liner C of said axially narrowest ply of reinforcement elements by a second profiled element of rubber mix G, and wherein said first and second profiled elements of rubber mix P and G and said liner C have secant modules of elasticity under tension at 10% elongation MP, MG, MC respectively such that $MC \geq MG > MP$.

2. A tire according to claim 1, wherein the axially outer end of the second profiled element of rubber mix G is located at a distance from said plane at least equal to half the width of said axially narrower ply of reinforcement elements.

3. A tire according to claim 1, wherein the second profiled element of rubber mix G has its axially inner end located at a distance from the equatorial plane at most equal to the distance between said plane and the axially inner end of said first profiled element of rubber mix P.

4. A tire according to claim 1, the crown reinforcement being formed of at least one working reinforcement comprising at least two plies of reinforcement elements, which are parallel to each other within each ply and crossed from one ply to the next, said two plies being of unequal axial widths, and furthermore comprising a protective crown ply, radially external to the working crown reinforcement, of an axial width between those of the working plies and greater than the width of the working ply radially adjacent to said protective crown ply, wherein the axially outer end of the first profiled element of rubber mix P is located at a distance from said plane at least equal to half the width of the protective crown ply.

5. A tire according to claim 4, wherein the axially inner end of the first profiled element of rubber mix P is located at a distance from the equatorial plane at least equal to half the width of the axially least wide working ply.

6. A tire according to claim 1, the crown reinforcement being composed of at least one working reinforcement comprising at least one working ply of reinforcement elements, wherein a third profiled element of rubber mix B borders the end of the radially innermost working ply of reinforcement elements, and wherein said third profiled element of rubber mix B is at least in part radially internal to said radially innermost working ply.

7. A tire according to claim 6, wherein the third profiled element of rubber mix B surrounds the end of their radially innermost working ply and in that said third profiled element of rubber mix B has a part radially external to the radially innermost working ply.

8. A tire according to claim 1, the crown reinforcement being composed of at least one working reinforcement comprising at least one ply of reinforcement elements, wherein the second profiled element of rubber mix G surrounds the end of the radially innermost working ply and wherein said second profiled element of rubber mix G has a part radially internal to the radially innermost working ply.

* * * * *